United States Patent
Stilling

[11] Patent Number: 5,838,474
[45] Date of Patent: Nov. 17, 1998

[54] PROCESS AND CIRCUIT ARRANGEMENT FOR TRANSMITTING RECEIVED SIGNALS FROM AN ANTENNA TO A BASE STATION OF A RADIO SYSTEM

[75] Inventor: Bernd Stilling, Munich, Germany

[73] Assignee: Siemens Aktiengesellschaft, Munich, Germany

[21] Appl. No.: 708,303

[22] Filed: Sep. 4, 1996

[30] Foreign Application Priority Data

Sep. 8, 1995 [DE] Germany .................. 195 33 262.8

[51] Int. Cl.[6] .................................................. H04B 10/00
[52] U.S. Cl. .................. 359/173; 359/145; 359/152; 455/524
[58] Field of Search .............................. 359/117, 118, 359/135, 136, 145, 167, 172, 152, 173; 455/56.1; 379/56, 59

[56] References Cited

U.S. PATENT DOCUMENTS

| | | | |
|---|---|---|---|
| 4,916,460 | 4/1990 | Powell | 359/152 |
| 5,159,479 | 10/1992 | Takagi | 359/154 |
| 5,251,053 | 10/1993 | Hidemann | 359/148 |
| 5,278,690 | 1/1994 | Vella-Coleiro | 359/152 |
| 5,424,864 | 6/1995 | Emura | 359/173 |
| 5,648,961 | 7/1997 | Ebihara | 370/282 |
| 5,682,256 | 10/1997 | Motley et al. | 359/117 |

*Primary Examiner*—Rafael Bacares
*Attorney, Agent, or Firm*—Hill & Simpson

[57] ABSTRACT

For transmitting received signals from an antenna (A) to a base station (BS) of a radio system, optical signals, which are transmitted to the base station (BS) via a light guide (L), are generated in an antenna unit (AE) connected to the antenna (A). An optical carrier is generated in the base station (BS) and is fed to the antenna unit (AE). There, the optical carrier is modulated, using an electro-optical modulator (EO), in a way corresponding to the received signals coming from the antenna (A) and is transmitted to the base station (BS) via a light guide (L). The present invention dispenses with the need for dedicated lasers in the antenna units (AE).

17 Claims, 2 Drawing Sheets

PROCESS AND CIRCUIT ARRANGEMENT FOR TRANSMITTING RECEIVED SIGNALS FROM AN ANTENNA TO A BASE STATION OF A RADIO SYSTEM

BACKGROUND OF THE INVENTION

The present invention relates to a process for transmitting received signals from an antenna to a base station of a radio system, preferably a mobile radio system. Furthermore, the present invention relates to a circuit arrangement, a base station and an antenna unit for carrying out the process.

A radio system usually has at least one base station, via which a radio link to a subscriber station, for example, a mobile station of a mobile radio system, is established. One or more antennas are usually connected to such a base station by electrical cables, in particular coaxial cables. If the base stations are relatively large and cannot be readily installed at the locations at which the antennas are also to be installed, occasionally quite long cable connections are required. If the distances between the two base stations and the antennas are relatively large, large power amplifiers and/or very low-loss cables are required in the base station, with the result that the costs are correspondingly large.

It is also already known to provide in the base station a laser, the output light of which is modulated by radio-frequency transmitted signals in an E/O (electric-to-optic) transducer. The modulated light signals are then transmitted as analog signals via light guides to a remote antenna unit and are then converted by an O/E (optic-to-electric) transducer back into a corresponding electrical signal, which is fed via a power amplifier to the antenna. At the receiving end, as represented in FIG. 4, the signal coming from the antenna A is fed in a corresponding way via a preamplifier VV in the antenna unit AE to an electro-optical-modulator EO, which, using a laster LA and an associated automatic control RE, generates an optical carrier modulated in a way corresponding to the received signal. Alternatively, a laser diode modulated directly by the received signal may also be used. The received signals are then fed via a light guide L to an O/E (optic-to-electric) transducer OE in the base station BS, which converts the received signal back into an electric signal, which is then conditioned in a processing unit VE and passed on. Such arrangements with remote antennas are described, for example, in Ichikawa H., Ohtsuka H., Murase T.: Fiber-Optic Microcell Radio System with a Spectrum Delivery Switch, IEICE Trans. Electron., Vol. E76-C, No. 2, February 1993, pages 279 to 286 and Shibutani M., et al.: Feasibility Studies on an Optical Fiber Feeder System for Microcellular Mobile Communications Systems, International Communication Conference (ICC) 1991, paper 37.2, pages 1176 to 1181.

However, on account of the high fluctuations in the received field strength, the dynamic requirements for the optical transmission system are very high. Therefore, in the case of intensity modulation of the laser, only lasers with a very low intensity noise (RIN, Relative Intensity Noise) can be used. This means that a sophisticated, and consequently expensive, laser, including the necessary automatic control circuits, must be used in each of the numerous remote antenna units.

SUMMARY OF THE INVENTION

It is an object of the present invention to provide a process and a circuit arrangement for transmitting received signals from an antenna to a base station which requires little outlay and can be produced with low costs. Furthermore, the present invention has the object of providing a corresponding base station and a corresponding antenna unit.

In general terms the present invention is a process for transmitting received signals from an antenna to a base station of a radio system. Optical signals are generated in an antenna unit, which is connected to the antenna, and transmitted to the base station via a light guide. An optical carrier is generated in the base station. the optical carrier is fed to the antenna unit, is modulated there, using an electro-optical modulator, in a way corresponding to the received signals coming from the antenna and is transmitted to the base station via a light guide.

Advantageous developments of the present invention are as follows.

A plurality of antennas and associated antenna units are provided. The optical carrier is fed from the base station to each antenna unit in a star form via a respective further light guide.

A plurality of antennas and associated antenna units are provided. The optical carrier is fed from the base station to an antenna unit via a further light guide and is fed from this antenna unit to at least one further antenna unit via a respective light guide.

The optical carrier is fed from the base station to the antenna unit in wavelength division multiplex via a further light guide, provided for transmission of transmitted signals from the base station to the antenna unit.

The optical carrier is fed from the base station to the antenna unit via the same light guide via which the received signals are also transmitted to the base station.

An electro-optical reflection modulator is used as the electro-optical modulator.

The present invention is also a circuit arrangement for carrying out the above-described process. In the base station there is provided a laser, which generates an optical carrier and which emits it to the antenna unit via a light guide. In the antenna unit there is provided an electro-optical modulator, which modulates the optical carrier generated in the base station in a way corresponding to the received signals coming from the antenna and transmits it to the base station via a light guide.

Advantageous developments of this embodiment of the present invention are as follows.

A plurality of antennas and associated antenna units are provided. Downstream of the laser there is a branching element, which feeds the optical carrier from the base station to each antenna unit in a star form via a respective further light guide.

A plurality of antennas and associated antenna units are provided. At least one of the antenna units contains a further branching element, via which the optical carrier transmitted to it from the base station via a further light guide is fed to at least one further antenna unit.

The transmitted signals are transmitted from the base station to the antenna unit via a light guide. The light guide is also provided for transmission of the optical carrier in wavelength division multiplex to the antenna unit.

Couplers are provided, with which the optical carrier is fed from the base station to the antenna unit via the same light guide via which the received signals are also transmitted to the base station.

The electro-optical modulator is designed as an electro-optical reflection modulator.

The present invention is also a base station for carrying out the above-described process. It contains a laser, which generates an optical carrier and emits it to the antenna unit via a light guide. A plurality of antennas and associated antenna units can be connected. Downstream of the laser there is a branching element, which feeds the optical carrier from the base station to each antenna unit in a star form via a respective further light guide.

The present invention is also an antenna unit for carrying out the above-described process. It contains an electro-optical modulator, which modulates the optical carrier generated in the base station in a way corresponding to the received signals coming from the antenna and emits it to a light guide. It contains a further branching element, via which the optical carrier transmitted to it from the base station can be fed to at least one further antenna unit. The electro-optical modulator is designed as an electro-optical reflection modulator.

According to the present invention, an optical carrier is generated in the base station, is fed to the antenna unit and is modulated there, using an electro-optical modulator, in a way corresponding to the received signals coming from the antenna and is transmitted back to the base station via a light guide.

The present invention has the advantage that, because of the absence of a laser and an automatic laser control in the antenna unit, the volume and power consumption of the latter are significantly smaller. In addition, by the use of a central laser in the base station, the costs can be significantly lowered. However, the feasible distance between the base station and the antenna unit is less than in the case of the conventional solution, because the optical signal is otherwise attenuated on the path between the base station and the antenna unit, and on the return path. On account of the generally short distance between the base station and the antenna unit, this restriction does not have adverse effects in practice.

It has already been proposed for digital transmission to use for subscriber lines a central laser in the exchange, the optical carrier thereof being distributed to a plurality of subscribers, with the result that it is possible to dispense with the need for the subscriber himself to have a laser. However, these solutions concern only digital transmission at relatively low bit rates, so it is possible for inexpensive lasers to be used by each subscriber. In the case of this application, the permissible fiber attenuation is also comparatively high. In contrast, the transmission to the antenna units takes place in an analogous way at the corresponding radio frequencies, with the result that the requirements for the lasers are very much higher. In addition, the distance from the antenna units is generally shorter than in the case of subscriber lines. Circuit arrangements for subscriber-line circuits are known, for example, from Altwegg L. et al.: A Subscriber Loop with no Optical Source at the Customer Side, ECOC 91, pages 609 to 612 and Perrier P. A. Et al.: A photonic subscriber loop architecture using a single wavelength per bidirectional communication, EFOC 92, pages 141 to 143 and Murphy E. J. et al.: Simultaneous Single-Fiber Transmission of Video and Bidirectional Voice/Data Using LiNb03 Guided-Wave Devices, Journal of Lightwave Technology, Vol. 6, No. 6, June 1988, pages 937 to 945.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
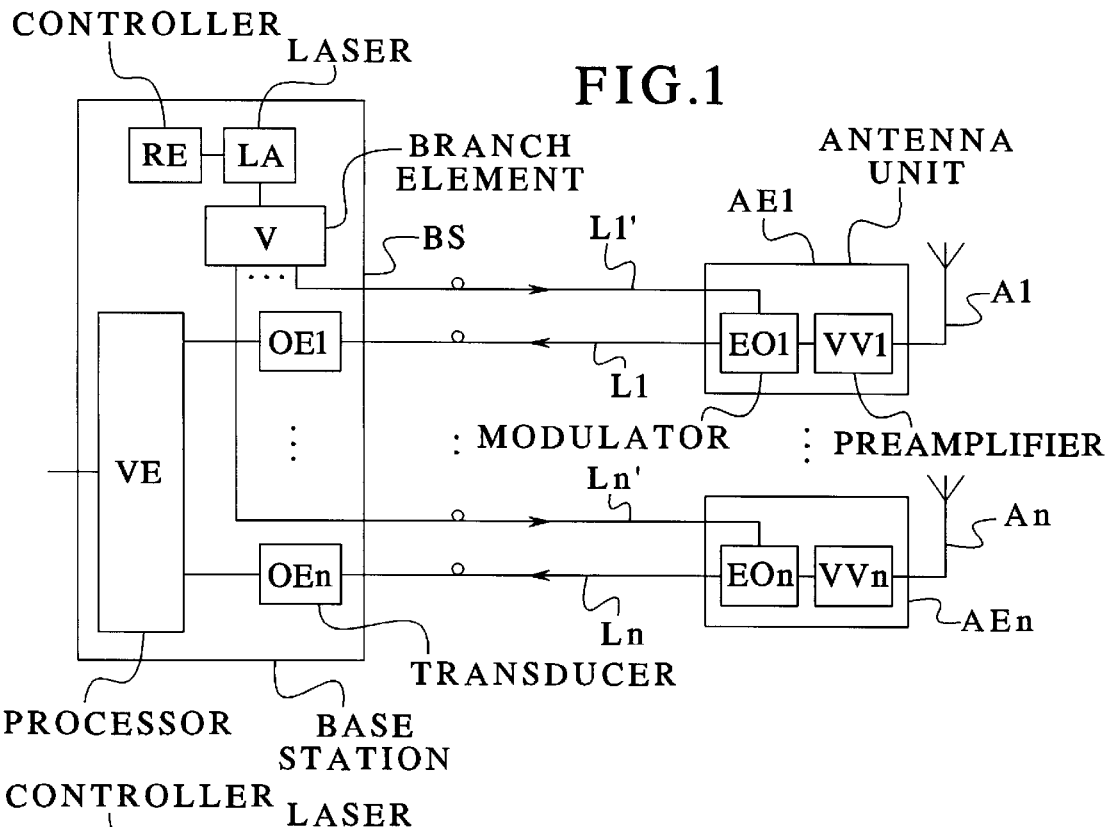
FIG. 1 shows a block diagram of a first embodiment of a circuit arrangement according to the present invention.

In the case of the first embodiment of a circuit arrangement according to the present invention, represented in FIG. 1, a central laser LA is provided in the base station BS. In an intensity modulation, this laser LA is, for example, a solid-state laser with a very low RIN. The optical carriers required by E/O transducers EO1 to EOn in the antenna units AE1 to AEn is generated using the automatic control RE in the laser LA and is fed to the antenna units AE1 to AEn via a branching element V and light guides L1 ' to Ln '.

Provided in the antenna units AE1 to AEn are the electro-optical modulators EO1 to EOn, which modulate the optical carrier with the received signals arriving from the antennas A1 to An via preamplifiers VV1 to VVn. The modulated carrier signals then pass via in each case a further light guide L1 to Ln back to the base station BS. There, in each case an O/E transducer OE1 to OEn converts the modulated carrier signals back into the received signals and passes them to the processing unit VE.

Figure 2:
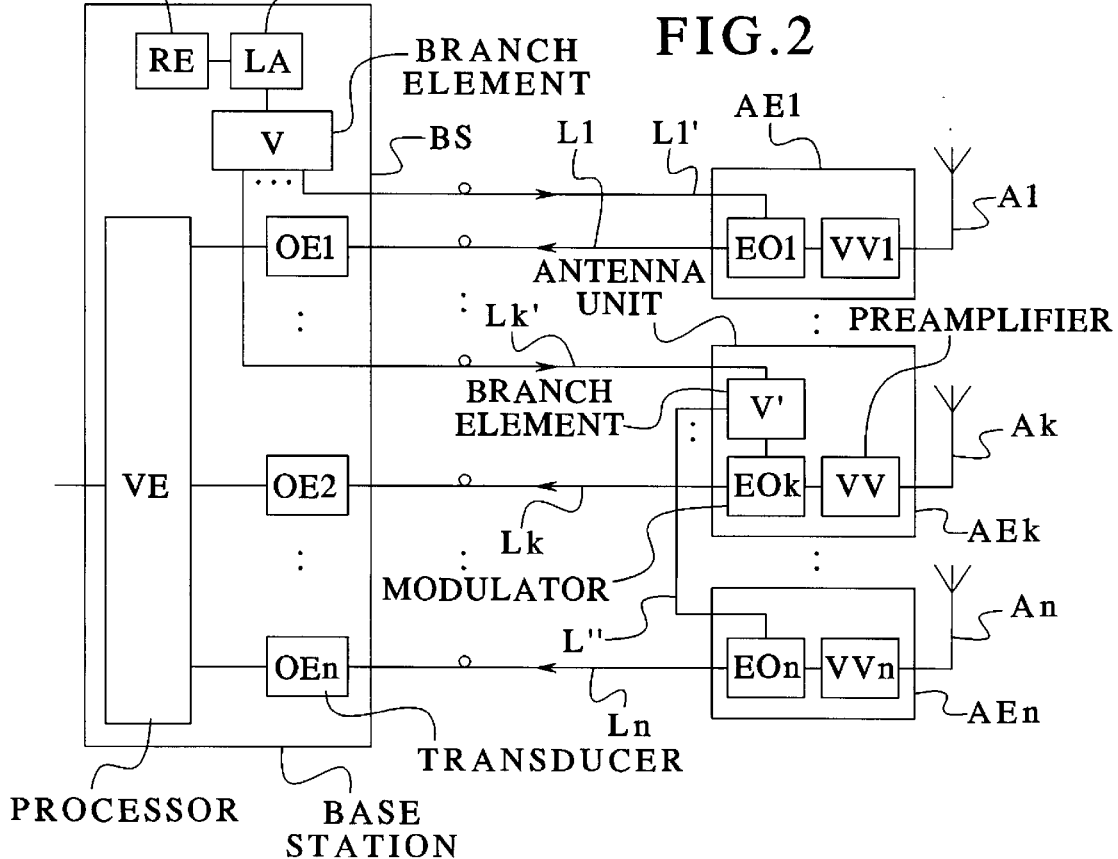
FIG. 2 shows a block diagram of a second embodiment of the circuit arrangement according to the present invention.

The second embodiment, represented in FIG. 2, essentially differs from the embodiment represented in FIG. 1 in that a branching element V' is provided in the antenna unit AEK and the distribution of the optical carrier is performed at the antenna units AE> In the case of the representation in FIG. 2, the antenna units AEK to AEn are supplied with the optical carrier from the branching element V'. It goes without saying that branching elements may also be provided in a plurality of antenna units AE and consequently a ring-like supply may take place, in that the optical carrier is passed on by means of a branching element from one antenna unit AE to the next.

The transmission lines (not shown) may also be used for the feeding of the optical carriers to the antenna units AE. In this case, the transmission takes place in wavelength division multiplex, so not additional light guides L' are required.

Figure 3:
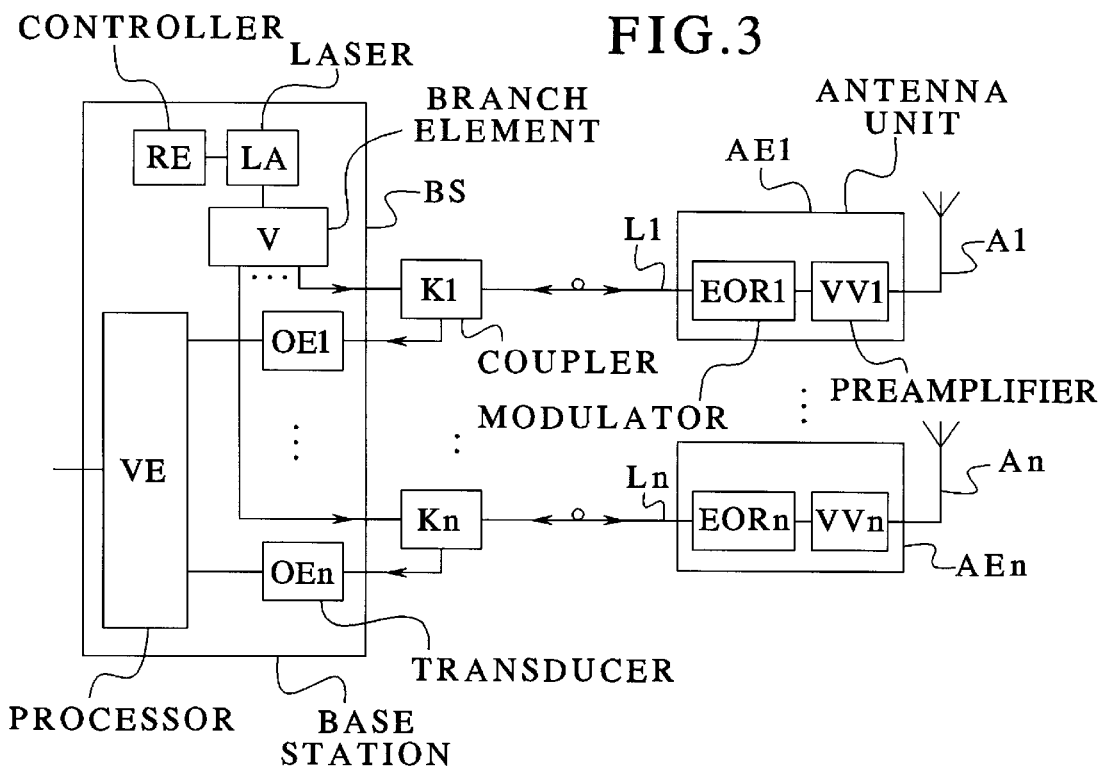
FIG. 3 shows a block diagram of a third embodiment of the circuit arrangement according to the present invention.
Figure 4:
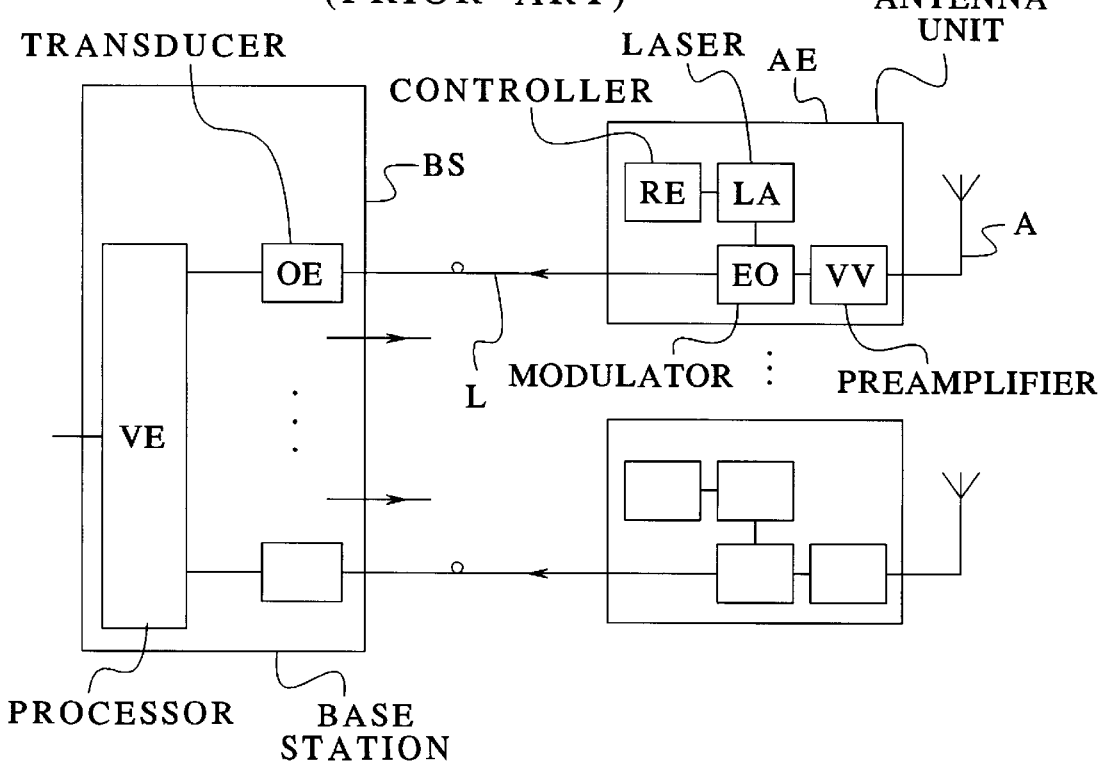
FIG. 4 shows a block diagram of a circuit arrangement according to the prior art.

In the case of the third embodiment, represented in FIG. 3, for the receiving end there is likewise only required in each case a single light guide L1 to Ln. For this purpose, at the base station BS end, the light guides L1 to Ln are in each case provided with a coupler K1 to Kn. Consequently, both the optical carrier and the modulated received signal can be transmitted via the same light guide L. The electro-optical reflection modulators EOR1 to EOrn.

If non-reflecting electro-optical modulators are used, couplers are likewise required at the antenna units AE end.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting received signals from an antenna to a base station of a radio system, comprising:

providing an antenna unit connected to the antenna;

generating an optical carrier in the base station, the optical carrier being fed to the antenna unit;

modulating the optical carrier in the antenna unit using an electro-optical modulator, in a way corresponding to received signals coming from the antenna; and returning the modulated optical signals to the base station via the light guide.

2. The method according to claim 1, wherein a plurality of antennas and associated antenna units are provided, and wherein the optical carrier is fed from the base station to each antenna unit of the plurality of antenna units in a star configuration via a respective further light guide.

3. The method according to claim 1, wherein a plurality of antennas and associated antenna units are provided, and wherein the optical carrier is fed from the base station to a respective antenna unit of the plurality of antenna units via a further light guide and is fed from the respective antenna unit to at least one further antenna unit via a respective light guide.

4. The method according to claim 1, wherein the optical carrier fed from the base station to the antenna unit is wavelength division multiplexed via a further light guide, provided for transmission of transmitted signals from the base station to the antenna unit.

5. The method according to claim 1, wherein the optical carrier is fed from the base station to the antenna unit via the same light guide via which the received signals are also transmitted to the base station.

6. The method according to claim 5, wherein an electro-optical reflection modulator is used as the electro-optical modulator.

7. A circuit arrangement for transmitting received signals from at least one antenna to a base station, comprising:

at least one antenna unit;

a base station having a laser, which generates an optical carrier that is transmitted to the antenna unit via a light guide;

the antenna unit having an electro-optical modulator, which modulates the optical carrier generated in the base station in a way corresponding to received signals coming from the antenna, and returns the modulated optical carrier to the base station via the light guide.

8. The circuit arrangement according to claim 7, wherein the circuit arrangement has a plurality of antennas and associated antenna units, and wherein a branching element downstream of the laser in the base unit, which feeds the optical carrier from the base station to each antenna unit in a star configuration via a respective further light guide.

9. The circuit arrangement according to claim 7, wherein circuit arrangement has a plurality of antennas and associated antenna units, and wherein at least one of the antenna units has a further branching element, via which the optical carrier transmitted to it from the base station via further light guide is fed to at least one further antenna unit.

10. The circuit arrangement according to claim 7, wherein the signals transmitted by the base station are communicated from the base station to the antenna unit via a light guide, and wherein the light guide is also provided for transmission of the optical carrier in wavelength division multiplex to the antenna unit.

11. The circuit arrangement according to claim 7, wherein the circuit arrangement has couplers, via which the optical carrier is fed from the base station to the antenna unit via a common light guide with received signals that are also transmitted to the base station.

12. The circuit arrangement according to claim 11, wherein the electro-optical modulator is an electro-optical reflection modulator.

13. A base station for use in transmitting received signals from an antenna to a base station of a radio system, comprising:

a laser, which generates an optical carrier that is transmitted to an antenna unit via a light guide;

wherein, the optical carrier is modulated in the antenna unit, using an electro-optical modulator, in a way corresponding to the received signals coming from the antenna and returned to the base station via a light guide.

14. The base station according to claim 13, wherein a plurality of antennas and associated antenna units of the laser, which feeds the optical carrier from the base station to each antenna unit in a star configuration via a respective further light guide.

15. An antenna unit for use in transmitting received signals from an antenna to a base station of a radio system, comprising:

an electro-optical modulator, which modulates an optical carrier generated in the base station in a way corresponding to received signals coming from the antenna and emits the modulated optical carrier to a light guide;

wherein the modulated optical carrier is returned to the base station via a light guide.

16. The antenna unit according to claim 15, wherein the antenna unit has a further branching element, via which the optical carrier transmitted to it from the base station can be fed to at least one further antenna unit.

17. The antenna unit according to claim 15, wherein the electro-optical modulator is an electro-optical reflection modulator.

* * * * *